US010624488B2

(12) United States Patent
Lee et al.

(10) Patent No.: US 10,624,488 B2
(45) Date of Patent: Apr. 21, 2020

(54) SYSTEM AND METHOD FOR THE PREPARATION OF BEVERAGES

(71) Applicant: Lify Company Limited, Hong Kong (HK)

(72) Inventors: Kong Wai Lee, Hong Kong (HK); Tak Chi Lee, Hong Kong (HK)

(73) Assignee: Lify Company Limited, Hong Kong (HK)

( * ) Notice: Subject to any disclaimer, the term of this patent is extended or adjusted under 35 U.S.C. 154(b) by 0 days.

(21) Appl. No.: 16/556,364

(22) Filed: Aug. 30, 2019

(65) Prior Publication Data

US 2020/0069105 A1 Mar. 5, 2020

Related U.S. Application Data (60) Provisional application No. 62/727,515, filed on Sep. 5, 2018.

(51) Int. Cl.
| | | |
|---|---|---|
| *A47J 31/34* | (2006.01) | |
| *A47J 31/36* | (2006.01) | |
| *A47J 31/44* | (2006.01) | |
| *A47J 27/21* | (2006.01) | |
| *A47J 31/56* | (2006.01) | |
| *A47J 31/06* | (2006.01) | |

(52) U.S. Cl.
CPC ....... *A47J 31/3633* (2013.01); *A47J 31/4407* (2013.01); *A47J 31/4467* (2013.01); *A47J 27/21083* (2013.01); *A47J 31/0642* (2013.01); *A47J 31/56* (2013.01)

(58) Field of Classification Search
CPC ............................................ A47J 31/34–3695
See application file for complete search history.

(56) References Cited

U.S. PATENT DOCUMENTS

| | | | | |
|---|---|---|---|---|
| 7,942,093 | B2 * | 5/2011 | Morin | A47J 31/3619 99/280 |
| 8,210,096 | B2 * | 7/2012 | Fin | A47J 31/3638 99/295 |
| 2011/0020500 | A1 * | 1/2011 | Eichler | B65D 85/8043 426/84 |
| 2011/0183055 | A1 * | 7/2011 | Mariller | A47J 31/0673 426/433 |

(Continued)

FOREIGN PATENT DOCUMENTS

EP 3011876 A1 4/2016

*Primary Examiner* — Michael A Laflame, Jr.

(57) ABSTRACT

A beverage preparing system includes a beverage preparing machine, including a water inlet seat movable in a front-rear direction and formed with a rear water channel, a rear needled disc formed with rear perforating needles and mounted in the water inlet seat, an infusion housing movable in front of the water inlet seat and formed with a front water channel, a front needled disc formed with front perforating needles and mounted in the infusion housing, and an infusion capsule pre-packaged with raw plant material and held between the front and rear perforating needles by a clamp. The beverage preparing system further includes a mobile app communicatively connected to a controller of the beverage preparing machine, a cloud server and a cloud engine. A beverage preparing method is also disclosed.

21 Claims, 8 Drawing Sheets

(56) References Cited

U.S. PATENT DOCUMENTS

2014/0216266 A1\* 8/2014 Ruhl .................. A47J 31/0663
99/300
2016/0316958 A1\* 11/2016 Rijskamp .............. A47J 31/369
2019/0117010 A1\* 4/2019 Rotta .................. A47J 31/4467

\* cited by examiner

SYSTEM AND METHOD FOR THE PREPARATION OF BEVERAGES

CROSS-REFERENCE TO RELATED APPLICATIONS

This application claims the benefit of U.S. Provisional Patent Application No. 62/727,515 filed on Sep. 5, 2018, the entire content of which is hereby incorporated by reference.

TECHNICAL FIELD

The present disclosure relates to a system and method for the preparation of beverages, especially from tea leaves, herbs, and other raw plant materials.

BACKGROUND

To prepare hot beverages, machines using single-serve capsules or pods are utilized. The capsule or pod contains a substance which can be dissolved in hot water. These machines are normally used to prepare coffee.

The main problem of utilizing such machine and method to brew tea or raw herbal ingredients is that, tea is not prepared in the same way as coffee powder. Coffee beans are ground into coffee powder having consistent size and density, and the coffee powder is then pre-packaged into a pod or capsule format. However, raw herbal ingredients can come in various formats. Normally, raw plant materials are cut into small pieces of tea leaves measuring from 1 mm to 1 cm. These raw herbal ingredients are not compressed when pre-packaging into a single-serve format. Instead, they remain in a loose format in the capsule and hence create a lower internal pressure than that of coffee powder. Therefore, one of the problems in the extraction of single-serve herbal tea is the existence of inconsistent pressure inside the capsule due to different kinds of tea mixture, as well as their chemical and physical properties.

Another problem is that due to the inconsistent pressure and various properties of the raw plant materials inside the single-serve capsule, the brewing performance is inconsistent and unpredictable. When hot water is pumped into the single-serve capsule placed in a machine, the raw plant materials do not dissolve in hot water. Hence, this does not allow water flow and distribution in a pressurized environment since the raw plant materials are in a loose format. This results in a low-pressure brewing process and the tea prepared is not strong enough. Therefore, it is unable to differentiate the advantage of such brewing method from traditional tea pot brewing method.

A further problem is the large variety of raw tea and herb mixture to be contained in the single-serve capsule.

SUMMARY

According to one aspect of the present application, there is provided a beverage preparing system including a beverage preparing machine. The beverage preparing machine may include a water inlet seat being movable in a front-rear direction and provided therein with a rear water channel; a rear needled disc mounted in a front recess of the water inlet seat, the rear needled disc being provided on a front surface thereof with at least one rear perforating needle; an infusion housing being movable in front of the water inlet seat in the front-rear direction, and provided therein with a front water channel; a front needled disc mounted in a rear recess of the infusion housing, the front needled disc being provided on a rear surface thereof with at least one front perforating needle; an infusion capsule held between the at least one front and rear perforating needles by a clamp coupled between the water inlet seat and the infusion housing, the infusion capsule containing therein a raw plant material to be infused; and the water inlet seat, the front and rear needled discs, the clamp, and the infusion housing together define a sealed infusion chamber in which the raw plant material in the infusion capsule is infused.

The beverage preparing system may further include a sliding block connected to a rear side of the water inlet seat, the sliding block being movable forwards together with the water inlet seat and the rear needled disc until the at least one rear perforating needle actively pierces through a rear cover of the infusion capsule; hot water adapted to flow from the rear water channel and into the infusion capsule through the pierced rear cover thereof; and the infusion capsule being expandable forwards under pressure towards the at least one front perforating needle until the at least one front perforating needle passively pierces through a front cover of the infusion capsule, thereby discharging a resultant liquid inside the infusion capsule to the front water channel through the pierced front cover of the infusion capsule.

The beverage preparing system may further include at least one spring mounted between the water inlet seat and the infusion housing, the at least one spring being in a compressed state when the infusion chamber is sealed, and the at least one spring being adapted to expand and force the infusion housing apart from the water inlet seat, thereby rendering the infusion capsule to drop after the clamp is opened.

The beverage preparing system may further include a front movable frame connected to a front side of the infusion housing, the front movable frame comprising a central opening; a water outlet rear pressing seat mounted in a rear section of the central opening; and a water outlet nozzle mounted in a front section of the central opening, wherein the water outlet rear pressing seat and the water outlet nozzle are in fluid communication with the front water channel of the infusion housing.

In one embodiment, the clamp may include two arc-shaped clamping members, the two arc-shaped clamping members being movable between a clamp position in which the two arc-shaped clamping members clamp around two opposite curved side edges of the infusion capsule respectively, and a release position in which the two arc-shaped clamping members are spread out.

In one embodiment, a silicone ring may be mounted in the front recess of the water inlet seat.

In one embodiment, the infusion capsule may be disc-shaped.

In one embodiment, the infusion capsule is dimensioned to contain therein the raw plant material for preparing a single-serve beverage.

The beverage preparing system may further include a mobile application (app) installed on a mobile device, the mobile app is communicatively connected to a cloud server and a controller provided on the beverage preparing machine.

In one embodiment, the mobile app is configured to provide control of a set of brewing parameters, the set of brewing parameters including steeping time, infusion duration, beverage temperature, level of pressure, and beverage volume output.

In one embodiment, the cloud server saves and stores the set of brewing parameters as well as a set of personal data of a user.

In one embodiment, the set of personal data of the user may include the user's preferred brewing habit and formula, personal health and symptom check of the user, and regional weather forecast.

The beverage preparing system may further include a cloud engine coded with a set of algorithms to analyze the set of personal data of the user and give feedback and recommendation to the user.

In one embodiment, the mobile app is configured to display a set of optimum and recommended brewing parameters according to taste laboratory tests conducted internally by food scientists, the set of optimum and recommended brewing parameters including suggested and specified steeping time, infusion duration, beverage temperature, level of pressure, and beverage volume output for each beverage; the mobile app is configured to facilitate a user to send preset recommended brewing parameters to the controller of the beverage preparing machine with a touch of a button via WiFi communication; and the mobile app is configured to allow storage of up to thousands of brewing methods and recipes on the cloud server.

According to another aspect of the present application, there is provided a method for preparing beverages, including (i) providing a beverage preparing machine, including a water inlet seat being movable in a front-rear direction and provided therein with a rear water channel; a rear needled disc mounted in a front recess of the water inlet seat, the rear needled disc being provided on a front surface thereof with at least one rear perforating needle; an infusion housing being movable in front of the water inlet seat in the front-rear direction, and provided therein with a front water channel; and a front needled disc mounted in a rear recess of the infusion housing, the front needled disc being provided on a rear surface thereof with at least one front perforating needle; (ii) securing an infusion capsule between the at least one front and rear perforating needles by a clamp, the infusion capsule pre-packaged therein with a raw plant material; (iii) driving the water inlet seat forwards until the at least one rear perforating needle actively pierces through a rear cover of the infusion capsule, and the water inlet seat, the front and rear needled discs, the clamp, and the infusion housing together define a sealed infusion chamber in which the raw plant material in the infusion capsule is infused; (iv) pumping hot water through the rear water channel and into the infusion capsule within the sealed infusion chamber through the pierced rear cover of the infusion capsule; and (v) allowing infusion of the raw plant material in the infusion capsule under pressure according to a set of brewing parameters until the infusion capsule expands forwards and the at least one front perforating needle passively pierces through a front cover of the infusion capsule, thereby discharging a resultant liquid inside the infusion capsule to the front water channel through the pierced front cover of the infusion capsule.

The method for preparing beverages may further include installing a mobile application (app) on a mobile device, and using the mobile app to communicate with a cloud server and a controller provided on the beverage preparing machine.

The method for preparing beverages may further include controlling the set of brewing parameters through the mobile app, the set of brewing parameters including steeping time, infusion duration, beverage temperature, level of pressure, and beverage volume output.

The method for preparing beverages may further include saving and storing the set of brewing parameters as well as a set of personal data of a user on the cloud server.

In one embodiment, the set of personal data of the user may include preferred brewing habit and formula, personal health and symptom check, and regional weather forecast.

The method for preparing beverages may further include using a cloud engine coded with a set of algorithms to analyze the set of personal data of the user and give feedback and recommendation to the user.

Although the present disclosure is shown and described with respect to certain embodiments, it is obvious that equivalents and modifications will occur to others skilled in the art upon the reading and understanding of the specification. The present disclosure includes all such equivalents and modifications, and is limited only by the scope of the claims.

BRIEF DESCRIPTION OF THE DRAWINGS

Specific embodiments of the present disclosure will now be described by way of example with reference to the accompanying drawings wherein.

DETAILED DESCRIPTION

Reference will now be made in detail to a preferred embodiment of the present disclosure, examples of which are also provided in the following description. Exemplary embodiments of the disclosure are described in detail, although it will be apparent to those skilled in the relevant art that some features that are not particularly important to an understanding of the disclosure may not be shown or described in detail for the sake of clarity.

Furthermore, it should be understood that the disclosure is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of the present disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

Figure 1:
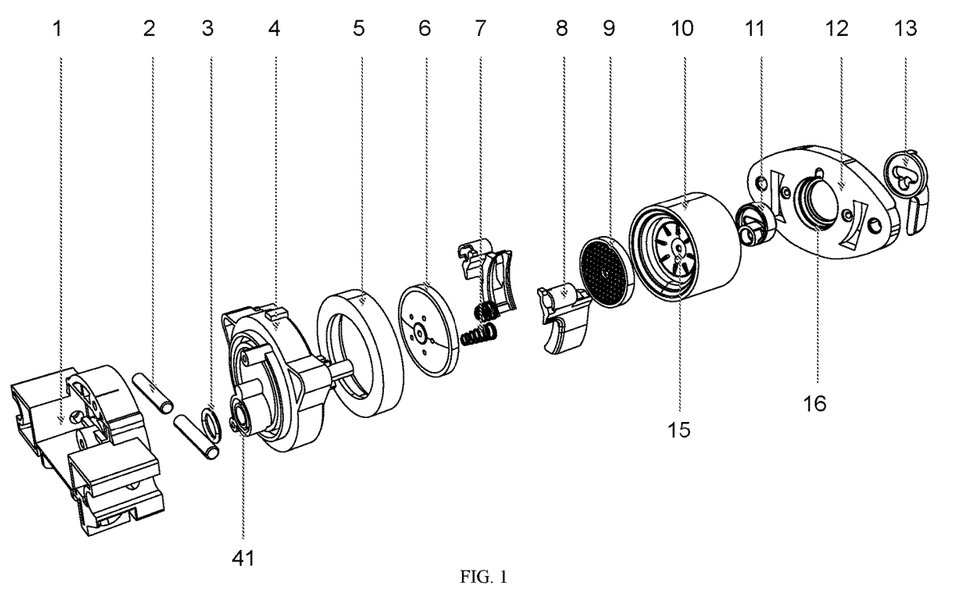
FIG. 1 is a rear exploded view of a beverage preparing machine according to an embodiment of the present disclosure.
Figure 2:
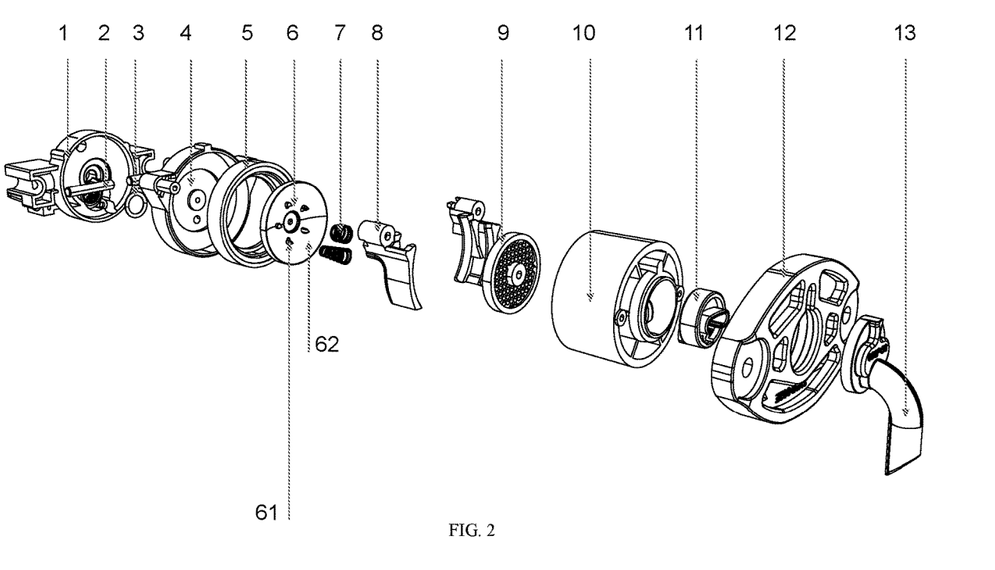
FIG. 2 is a front exploded view of the beverage preparing machine according to an embodiment of the present disclosure.

FIGS. 1-8 show a system and method for the preparation of beverages according to an embodiment of the present disclosure. FIG. 1 is an exploded view of an embodiment of a beverage preparing machine of the beverage preparing system. The beverage preparing machine may include a water inlet seat 4 which is movable in a front-rear direction. The water inlet seat 4 may be formed therein with a rear water channel 41 through which hot water can flow. A sealing ring 3 may be provided at an outlet of the rear water channel 41 for sealing purposes.

A rear needled disc 6 may be mounted in a front recess of the water inlet seat 4. A front surface of the rear needled disc 6 may be integrally formed with at least one rear perforating needle 61. In the embodiment shown in FIG. 2, there are five rear perforating needles 61. A silicone ring 5 may be mounted in the front recess of the water inlet seat 4 for sealing purposes.

An infusion housing 10 may be movable in front of the water inlet seat 4 in the front-rear direction. The infusion housing 10 may be formed therein with a front water channel 15 through which a prepared beverage can flow.

Figure 3:
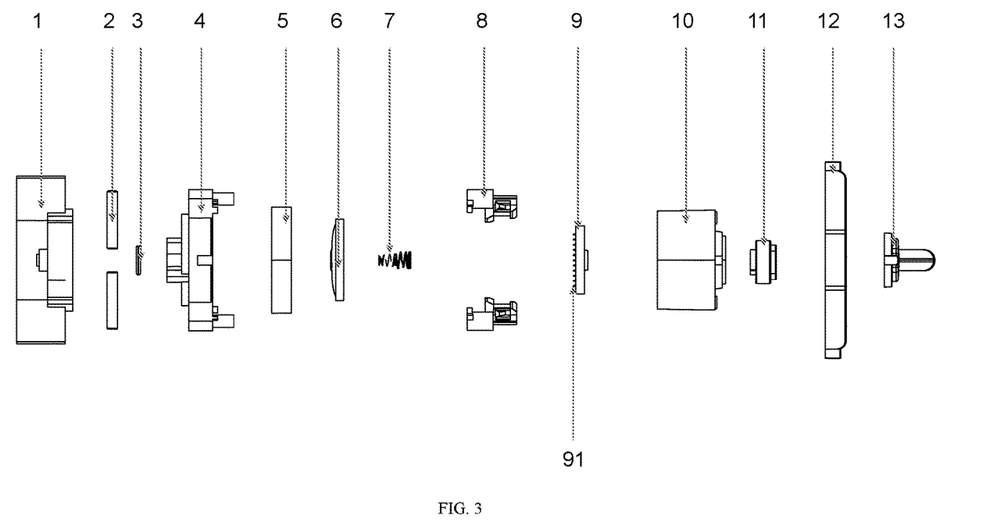
FIG. 3 is a top exploded view of the beverage preparing machine according to an embodiment of the present disclosure.
Figure 4:
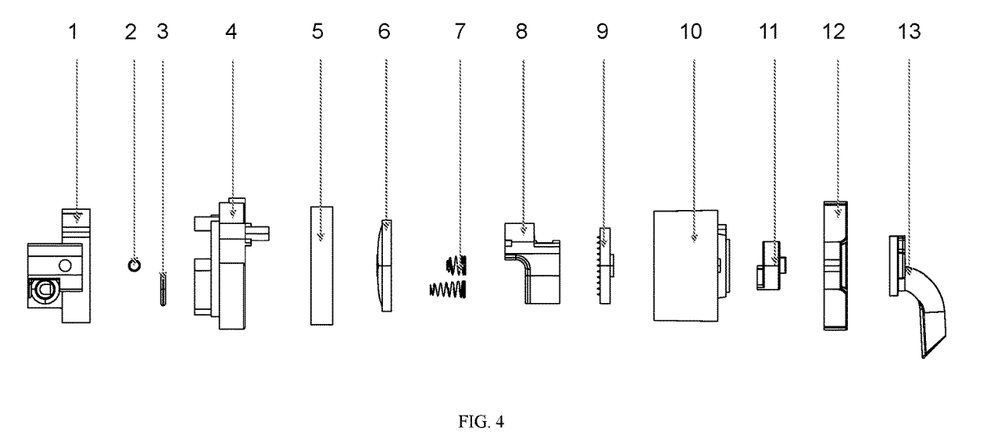
FIG. 4 is a side exploded view of the beverage preparing machine according to an embodiment of the present disclosure.

A front needled disc 9 may be mounted in a rear recess of the infusion housing 10. A rear surface of the front needled disc 9 may be integrally formed with at least one front perforating needle 91. As best illustrated in FIG. 3, the rear surface of the front needled disc 9 may be formed with a large number of front perforating needles 91.

The front and rear needled discs 9, 6 and the at least one front and rear perforating needles 91, 61 may be made of stainless steel or any other suitable material.

Figure 5:
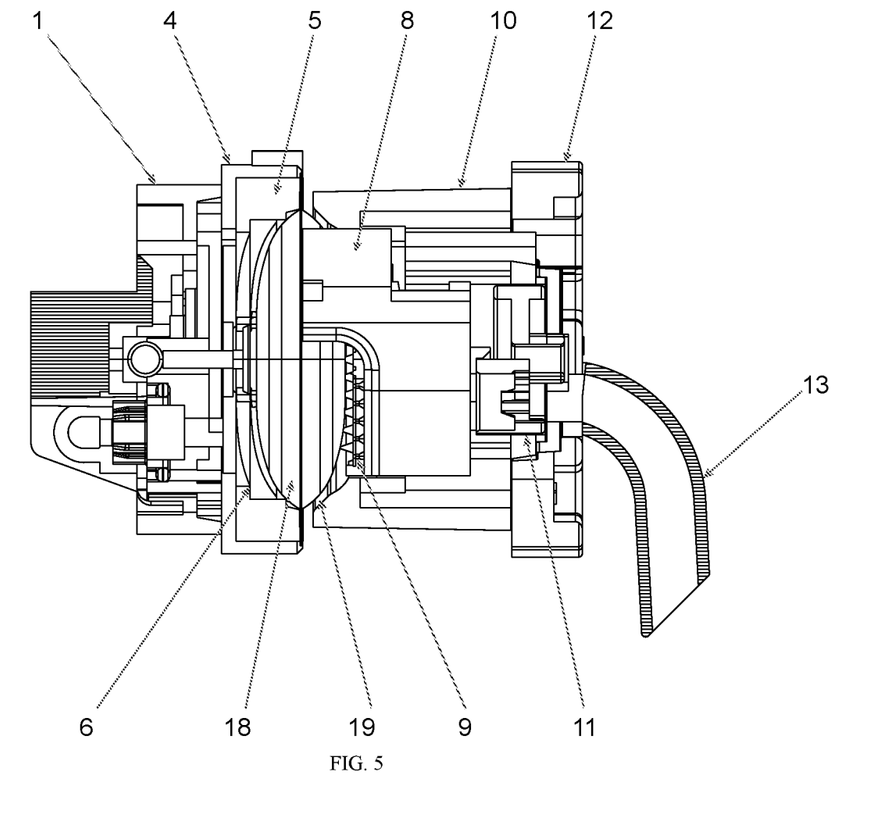
FIG. 5 is a cross sectional view of the beverage preparing machine according to an embodiment of the present disclosure.

As shown in FIG. 5, a single-serve infusion capsule 18 may be held between the at least one front and rear perforating needles 91, 61 by a clamp 8. The clamp 8 may be operatively coupled between the water inlet seat 4 and the infusion housing 10. The infusion capsule 18 may be dimensioned to contain therein tea leaves, herbs, or other raw plant materials to be infused for the preparation of a single-serve beverage. The tea leaves, herbs, or other raw plant materials can be pre-packaged into the infusion capsule 18. In this illustrated embodiment, the infusion capsule 18 may be in the shape of a disc, or in other similar shape. The disc-shaped infusion capsule 18 may include a front cover, a rear cover, and a circular side edge. The tea leaves, herbs, or other raw plant materials may be held between the front and rear covers.

The single-serve infusion capsule 18 may have an internal structure so that water can be trapped inside the infusion capsule 18 during steeping and infusion processes. The single-serve infusion capsule 18 may contain therein narrow pathways for water to circulate after the at least one rear perforating needle 61 pierced through the rear cover of the infusion capsule 18. This can facilitate the overall steeping process and create a sufficient high pressure for brewing. The front surface of the rear needled disc 6 may have a concave surface 62 conforming in shape with the rear cover of the infusion capsule 18.

The clamp 8 may include two arc-shaped clamping members. The two arc-shaped clamping members can be movable between a clamp position in which the two arc-shaped clamping members clamp around two opposite curved side edges of the infusion capsule respectively, and a release position in which the two arc-shaped clamping members are spread out.

As depicted in FIG. 5, the water inlet seat 4, the front and rear needled discs 9, 6, the clamp 8, the infusion housing 10, and the silicone ring 5 may together define a sealed infusion chamber 19 in which the tea leaves, herbs, or other raw plant materials in the infusion capsule 18 can be infused.

Referring back to FIG. 1, the beverage preparing machine may include a sliding block 1 connected to a rear side of the water inlet seat 4. The sliding block 1 may be slidable in the front-rear direction through rotary shafts 2, or by any other conventional mechanism. The sliding block 1 can move forwards together with the water inlet seat 4 and the rear needled disc 6 towards the infusion capsule 18.

The beverage preparing machine may further include a front movable frame 12 connected to a front side of the infusion housing 10. The front movable frame 12 may be formed with a central opening 16. A water outlet rear pressing seat 11 may be mounted in a rear section of the central opening 16, and a water outlet nozzle 13 may be mounted in a front section of the central opening 16. The water outlet rear pressing seat 11 and the water outlet nozzle 13 may be in fluid communication with the front water channel 15 formed in the infusion housing 10.

Figure 6A:
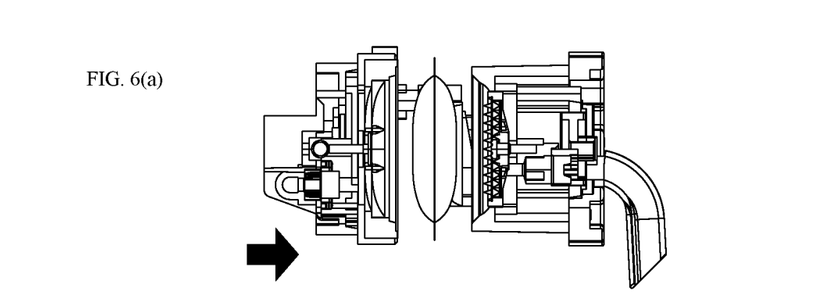
FIGS. 6(a)-6(c) show the operation of the beverage preparing machine according to an embodiment of the present disclosure.
Figure 6B:
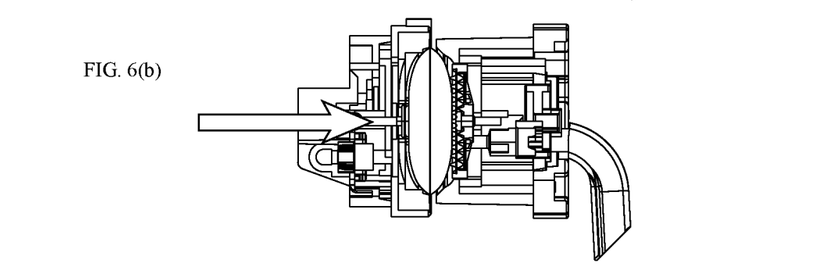
Figure 6C:
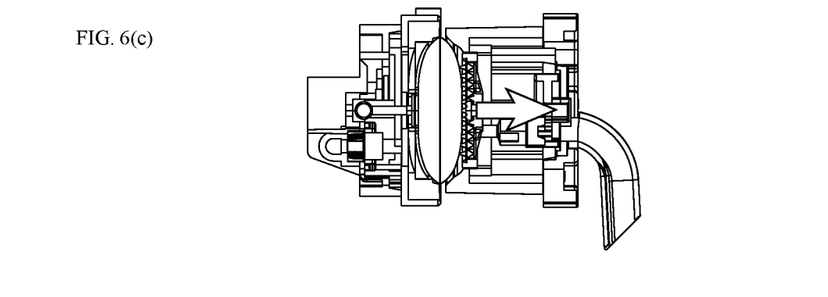
Figure 7A:
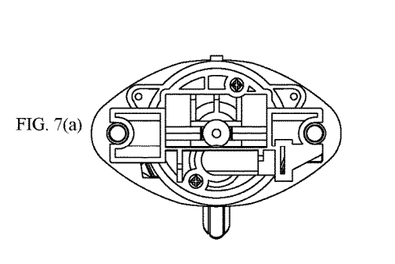
FIGS. 7(a)-7(f) show the rear, front, left, right, top and bottom views of the beverage preparing machine respectively according to an embodiment of the present disclosure.
Figure 7B:
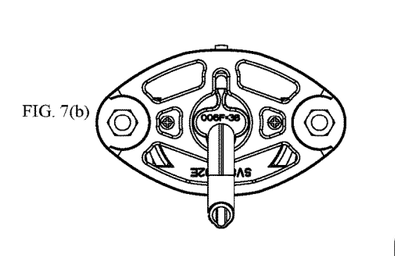
Figure 7C:
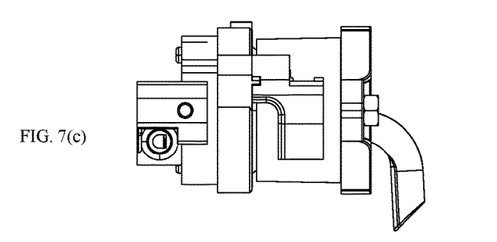
Figure 7D:
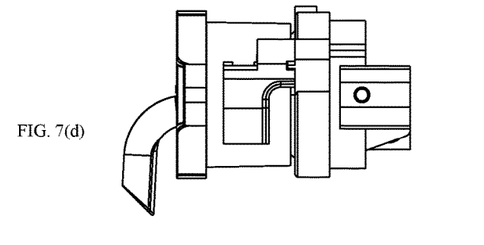
Figure 7E:
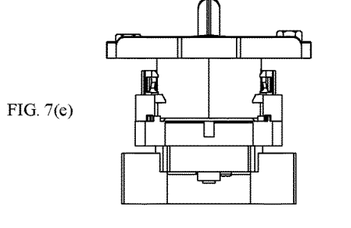
Figure 7F:
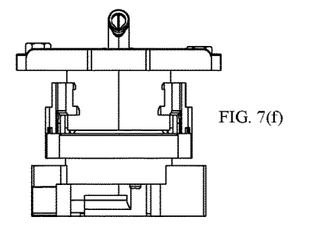

To prepare a beverage, the infusion capsule 18 is secured between the at least one front and rear perforating needles by the clamp 8. The water inlet seat 4 and the rear needled disc 6 are driven forwards by the sliding block 1 until the at least one rear perforating needle 61 actively pierces through a rear cover of the infusion capsule 18. The water inlet seat 4, the front and rear needled discs 9, 6, the clamp 8, and the infusion housing 10 together define a sealed infusion chamber 19 in which the tea leaves, herbs, or other raw plant materials in the infusion capsule 18 is infused.

After the rear cover of the infusion capsule 18 is pierced through by the at least one perforating needle 61, hot water is pumped into the beverage preparing machine through the rear water channel 41 formed in the water inlet seat 4 and into the infusion capsule 18 through the pierced rear cover of the infusion capsule 18.

Infusion of the tea leaves, herbs, or raw plant materials in the infusion capsule 18 begins according to a set of brewing parameters. At this point, the forward movement of the sliding block 1 stops, and the infusion capsule 18 also stops inside the sealed infusion chamber 19. No water is further pumped through the rear water channel 41. Hot water and steam inside the sealed infusion chamber 19 remain still. The beverage preparing machine enters into a steeping mode. This means that pumping of hot water into the sealed infusion chamber 19 stops for a period of time before restarting to pump more hot water into the sealed infusion chamber 19. This period of time can be adjusted according to the characteristics of the tea leaves, herbs or other raw plant materials to be infused. This creates a steeping or infusion process which allows even and thorough infusion of the tea leaves, herbs or other raw plant materials inside the infusion capsule 18, hence allowing the tea leaves, herbs, or raw plant materials to expand rapidly inside the infusion capsule 18. Such expansion creates a high pressure and hot water can fill up the entire internal space in the infusion capsule 18.

Under pressure, the infusion capsule 18 can expand in a front direction towards the at least one front perforating needle 91 of the front needled disc 9. This expansion process can produce a beverage under high pressure and can ensure a quick and even infusion of the tea leaves, herbs, or raw plant materials inside the infusion capsule 18. The infusion capsule 18 expands forwards towards the at least one front perforating needle 91 until the at least one front perforating needle 91 passively pierces through the front cover of the infusion capsule 18. Immediately after the front cover of the infusion capsule 18 is pierced through by the at least one front perforated needle 91, the pressure inside the infusion capsule 18 is relieved. The resultant liquid inside the infusion capsule 18 is then discharged to the front water channel 15 through the pierced front cover of the infusion capsule 18.

Through the active and passive piercing processes and the high pressure generated in the infusion capsule 18, an effective and ideal extraction of the essence from the tea leaves, herbs, or raw plant materials can be achieved.

The resultant liquid inside the expanded infusion capsule 18 flows into the front water channel 15 through the pierced front cover of the infusion capsule 18. The resultant liquid then flows through the water outlet rear pressing seat 11 and the water outlet nozzle 13 for collection by a cup.

The beverage preparing machine may further include at least one spring 7 mounted between the water inlet seat 4 and the infusion housing 10. The at least one spring 7 may be in a compressed state when the infusion chamber 19 is sealed. The at least one spring 7 can be adapted to expand and force the infusion housing 10 apart from the water inlet seat 4, thereby rendering the infusion capsule 18 to drop after the clamp 8 is opened.

It is understood that if the pressure relief process is too long or too short, it will affect the brewing result. The shape, position and material of the at least one front perforating needle 91 of the front needled disc 9 are specially designed after repeated trial and error. It is finally decided that the front needled disc 9 and the at least one front perforating needle 91 are made of stainless steel. The at least one front perforating needle 91 has a shape, position and length that can effectively pierce through the front cover of the infusion capsule 18. Pressure inside the infusion capsule 18 will be relieved immediately after the pressure reaches a critical point. This can prevent the liquid and the tea leaves, herbs, or raw plant materials from being clogged within the infusion capsule 18. At the same time, it can avoid any damage to the support structure inside the infusion capsule 18. The liquid can flow smoothly in the infusion capsule 18. The pressure relief process and time can be adjusted so that the best extraction effect can be achieved. Furthermore, the stainless-steel needled disc can be used repeatedly and is not easy to wear out. This can prolong the life of the product and will not affect the brewing effect due to long-term and high frequency of use.

The time to pierce through the infusion capsule 18 can be calculated according to the expansion of each particular tea leaf, herb, or raw plant material to be infused inside the infusion capsule 18. If the piercing action is not done precisely, it may cause the problem of forming a gap between the at least one front perforating needle 91 and the infusion capsule 18. As a result, the resultant liquid is trapped inside the infusion capsule 18 and is not able to flow out of the infusion capsule 18 to produce the beverage. On the other hand, if the front needled disc 9 is positioned too close to the infusion capsule 18, or the at least one front perforating needle 91 is too long, liquid may flow out of the infusion capsule 18 before the desired pressure and time of the steeping process are reached, resulting in a beverage that is not precisely brewed, not strong enough, and inconsistent in strength.

The combination of active and passive piercing processes is designed for the characteristics of herbal medicine. It can allow steam and hot water to flow at a controlled flowing rate from the rear water channel 41 of the water inlet seat 4 and into the infusion capsule 18. In the infusion chamber 19, hot water can fully circulate in the infusion capsule 18, and the herbal material in the infusion capsule 18 can be fully infused and extracted, thereby greatly improving the infusion and extraction effect. Thus, pressure leakage and poor extraction will not be occurred.

Figure 8:
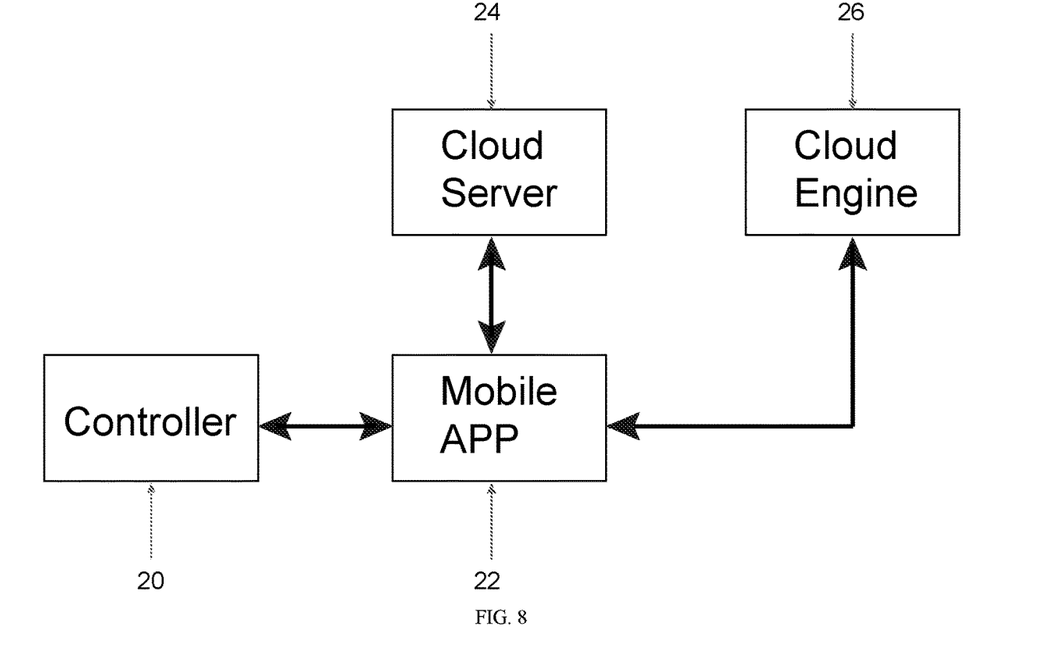
FIG. 8 is a block diagram showing a controller, a mobile app, a cloud server and a cloud engine of the beverage preparing system according to an embodiment of the present disclosure.

As shown in FIG. 8, the beverage preparing system of the present disclosure may further include a mobile application (app) 22 installed on a mobile device. The mobile app 22 may be communicatively connected to a cloud server 24 and a controller 20 provided on the beverage preparing machine. The mobile app 22 can establish a connection between the beverage preparing machine and a user. The controller 20 can be an electrical controller for the control of the operation of the beverage preparing machine. The mobile app 22 may be embedded into an Internet of Things (IoT) device where communication between the user's mobile app 22 and the beverage preparing machine can be established through an embedded WiFi module inside the beverage preparing machine.

The mobile app 22 may be configured to provide control of a set of brewing parameters. The set of brewing parameters may include steeping time, infusion duration, beverage temperature, level of pressure, and beverage volume output. These brewing parameters determine the overall strength and nutritious level, which could be altered for different preferences. The user can customize various brewing parameters through the mobile app 22.

The cloud server 24 can save and store the set of brewing parameters as well as a set of personal data of a user. The set of personal data of the user may include but is not limited to the user's preferred brewing habit and formula, personal health and symptom check of the user, and regional weather forecast.

The beverage preparing system may further include a cloud engine 26 coded with a set of algorithms to analyze the set of personal data of the user and give feedback and recommendation to the user.

Through the mobile app 22, a user is able to alter the steeping process, e.g. the steeping time/infusion seconds from 4 seconds up to 20 seconds, and create various levels of pressure, hence different levels of release of active ingredients. In order to be a user-friendly and easy to operate procedure, the mobile app 22 can be configured to display, for example on a mobile device, a set of optimum and recommended brewing parameters according to taste laboratory tests conducted internally by food scientists. The set of optimum and recommended brewing parameters may include suggested and specified steeping time, infusion duration, beverage temperature, level of pressure, and beverage volume output for each beverage. The mobile app 22 can be configured to facilitate a user to send preset recommended brewing parameters to the controller 20 of the beverage preparing machine with a touch of a button via WiFi communication. The mobile app 22 can also be configured to allow storage of up to thousands of brewing methods and recipes on the cloud server 24. The mobile app 22 can also allow a user to customize the temperature and the volume output of the beverage. These three parameters shall contribute to the overall brewing pressure of the beverage as well as its strength. This customization is needed due to the existing of large variety of herbal mixture from which the beverage is prepared. Each tea or herbal mixture requires a particular set of brewing parameters. The mobile app 22 of the present disclosure is particularly innovative as compared to a traditional coffee machine in which only one consistent pressure is required to brew various kinds or blends of coffee. Through the mobile app 22 of the present disclosure, a user can trace and record his or her preferred brewing habit and formula. The best and suitable beverage choice for a particular user can be given and recommended. This is an important factor because tea and herbal drinks are considered as healthy drinks and different types of tea or herb have been proven to have their particular benefits. Unlike coffee, different types of tea or herb may be suitable for different types of user with different body conditions. Therefore, such computing algorithm is crucial to precisely recommend a particular beverage to a particular user as a health supplement.

While the disclosure has been shown and described with particular references to a number of preferred embodiments thereof, it should be noted that various other changes or modifications may be made without departing from the scope of the appended claims.

What is claimed is:

1. A beverage preparing system, comprising:
   a beverage preparing machine, the beverage preparing machine comprising:
   a water inlet seat being movable in a front-rear direction and provided therein with a rear water channel;
   a rear needled disc mounted in a front recess of the water inlet seat, the rear needled disc being provided on a front surface thereof with at least one rear perforating needle;
   a silicone ring mounted in the front recess of the water inlet seat;
   an infusion housing being movable in front of the water inlet seat in the front-rear direction, and provided therein with a front water channel;
   a front needled disc mounted in a rear recess of the infusion housing, the front needled disc being provided on a rear surface thereof with at least one front perforating needle;
   a disc-shaped infusion capsule held between the at least one front and rear perforating needles by a clamp coupled between the water inlet seat and the infusion housing, the infusion capsule dimensioned to contain therein a raw plant material to be infused for preparation of a single-serve beverage; and
   at least one spring mounted between the water inlet seat and the infusion housing;
   the water inlet seat being movable forwards in a front direction towards the infusion capsule until the at least one rear perforating needle actively pierces through a rear cover of the infusion capsule; and the water inlet seat, the silicone ring, the front and rear needled discs, the clamp, and the infusion housing together define a sealed infusion chamber in which the raw plant material in the infusion capsule is infused; hot water adapted to flow from the rear water channel and into the infusion capsule through the pierced rear cover thereof; and
   the infusion capsule being expandable forwards under pressure towards the at least one front perforating needle until the at least one front perforating needle passively pierces through a front cover of the infusion capsule, thereby discharging a resultant liquid inside the infusion capsule to the front water channel through the pierced front cover of the infusion capsule.

2. A beverage preparing system, comprising:
   a beverage preparing machine, the beverage preparing machine comprising:
   a water inlet seat being movable in a front-rear direction and provided therein with a rear water channel;
   a rear needled disc mounted in a front recess of the water inlet seat, the rear needled disc being provided on a front surface thereof with at least one rear perforating needle;
   an infusion housing being movable in front of the water inlet seat in the front-rear direction, and provided therein with a front water channel;
   a front needled disc mounted in a rear recess of the infusion housing, the front needled disc being provided on a rear surface thereof with at least one front perforating needle;
   an infusion capsule held between the at least one front and rear perforating needles by a clamp coupled between the water inlet seat and the infusion housing, the infusion capsule containing therein a raw plant material to be infused; and
   the water inlet seat, the front and rear needled discs, the clamp, and the infusion housing together define a sealed infusion chamber in which the raw plant material in the infusion capsule is infused.

3. The beverage preparing system according to claim 2, further comprising:
   a sliding block connected to a rear side of the water inlet seat, the sliding block being movable forwards together with the water inlet seat and the rear needled disc until the at least one rear perforating needle actively pierces through a rear cover of the infusion capsule; hot water adapted to flow from the rear water channel and into the infusion capsule through the pierced rear cover thereof; and
   the infusion capsule being expandable forwards under pressure towards the at least one front perforating needle until the at least one front perforating needle passively pierces through a front cover of the infusion capsule, thereby discharging a resultant liquid inside the infusion capsule to the front water channel through the pierced front cover of the infusion capsule.

4. The beverage preparing system according to claim 2, further comprising at least one spring mounted between the water inlet seat and the infusion housing, the at least one spring is in a compressed state when the infusion chamber is sealed, and the at least one spring is adapted to expand and force the infusion housing apart from the water inlet seat, thereby rendering the infusion capsule to drop after the clamp is opened.

5. The beverage preparing system according to claim 2, further comprising:
   a front movable frame connected to a front side of the infusion housing, the front movable frame comprising a central opening;
   a water outlet rear pressing seat mounted in a rear section of the central opening; and
   a water outlet nozzle mounted in a front section of the central opening, wherein the water outlet rear pressing seat and the water outlet nozzle are in fluid communication with the front water channel of the infusion housing.

6. The beverage preparing system according to claim 2, wherein the clamp comprises two arc-shaped clamping members, the two arc-shaped clamping members being movable between a clamp position in which the two arc-shaped clamping members clamp around two opposite curved side edges of the infusion capsule respectively, and a release position in which the two arc-shaped clamping members are spread out.

7. The beverage preparing system according to claim 2, wherein a silicone ring is mounted in the front recess of the water inlet seat.

8. The beverage preparing system according to claim 2, wherein the infusion capsule is disc-shaped.

9. The beverage preparing system according to claim 2, wherein the infusion capsule is dimensioned to contain therein the raw plant material for preparing a single-serve beverage.

10. The beverage preparing system according to claim 2, further comprising a mobile application (app) installed on a mobile device, the mobile app is communicatively connected to a cloud server and a controller provided on the beverage preparing machine.

11. The beverage preparing system according to claim 10, wherein the mobile app is configured to provide control of a set of brewing parameters, the set of brewing parameters comprising steeping time, infusion duration, beverage temperature, level of pressure, and beverage volume output.

12. The beverage preparing system according to claim 11, wherein the cloud server saves and stores the set of brewing parameters as well as a set of personal data of a user.

13. The beverage preparing system according to claim 12, wherein the set of personal data of the user comprises the user's preferred brewing habit and formula, personal health and symptom check of the user, and regional weather forecast.

14. The beverage preparing system according to claim 13, further comprising a cloud engine coded with a set of algorithms to analyze the set of personal data of the user and give feedback and recommendation to the user.

15. The beverage preparing system according to claim 14, wherein the mobile app is configured to display a set of optimum and recommended brewing parameters according to taste laboratory tests conducted internally by food scientists, the set of optimum and recommended brewing parameters comprising suggested and specified steeping time, infusion duration, beverage temperature, level of pressure, and beverage volume output for each beverage; the mobile app is configured to facilitate a user to send preset recommended brewing parameters to the controller of the beverage preparing machine with a touch of a button via WiFi communication; and the mobile app is configured to allow storage of up to thousands of brewing methods and recipes on the cloud server.

16. A method for preparing beverages, comprising:
providing a beverage preparing machine, comprising a water inlet seat being movable in a front-rear direction and provided therein with a rear water channel; a rear needled disc mounted in a front recess of the water inlet seat, the rear needled disc being provided on a front surface thereof with at least one rear perforating needle; an infusion housing being movable in front of the water inlet seat in the front-rear direction, and provided therein with a front water channel; and a front needled disc mounted in a rear recess of the infusion housing, the front needled disc being provided on a rear surface thereof with at least one front perforating needle;
securing an infusion capsule between the at least one front and rear perforating needles by a clamp, the infusion capsule pre-packaged therein with a raw plant material;
driving the water inlet seat forwards until the at least one rear perforating needle actively pierces through a rear cover of the infusion capsule, and the water inlet seat, the front and rear needled discs, the clamp, and the infusion housing together define a sealed infusion chamber in which the raw plant material in the infusion capsule is infused;
pumping hot water through the rear water channel and into the infusion capsule within the sealed infusion chamber through the pierced rear cover of the infusion capsule;
allowing infusion of the raw plant material in the infusion capsule under pressure according to a set of brewing parameters until the infusion capsule expands forwards and the at least one front perforating needle passively pierces through a front cover of the infusion capsule, thereby discharging a resultant liquid inside the infusion capsule to the front water channel through the pierced front cover of the infusion capsule.

17. The method for preparing beverages according to claim 16, further comprising installing a mobile application (app) on a mobile device, and using the mobile app to communicate with a cloud server and a controller provided on the beverage preparing machine.

18. The method for preparing beverages according to claim 17, further comprising controlling the set of brewing parameters through the mobile app, the set of brewing parameters comprising steeping time, infusion duration, beverage temperature, level of pressure, and beverage volume output.

19. The method for preparing beverages according to claim 18, further comprising saving and storing the set of brewing parameters as well as a set of personal data of a user on the cloud server.

20. The method for preparing beverages according to claim 19, wherein the set of personal data of the user comprises preferred brewing habit and formula, personal health and symptom check, and regional weather forecast.

21. The method for preparing beverages according to claim 20, further comprising using a cloud engine coded with a set of algorithms to analyze the set of personal data of the user and give feedback and recommendation to the user.

* * * * *